Aug. 9, 1932.　　　G. E. WILLIAMS　　　1,871,140
CONVEYER CHAIN
Filed May 28, 1930　　2 Sheets-Sheet 1
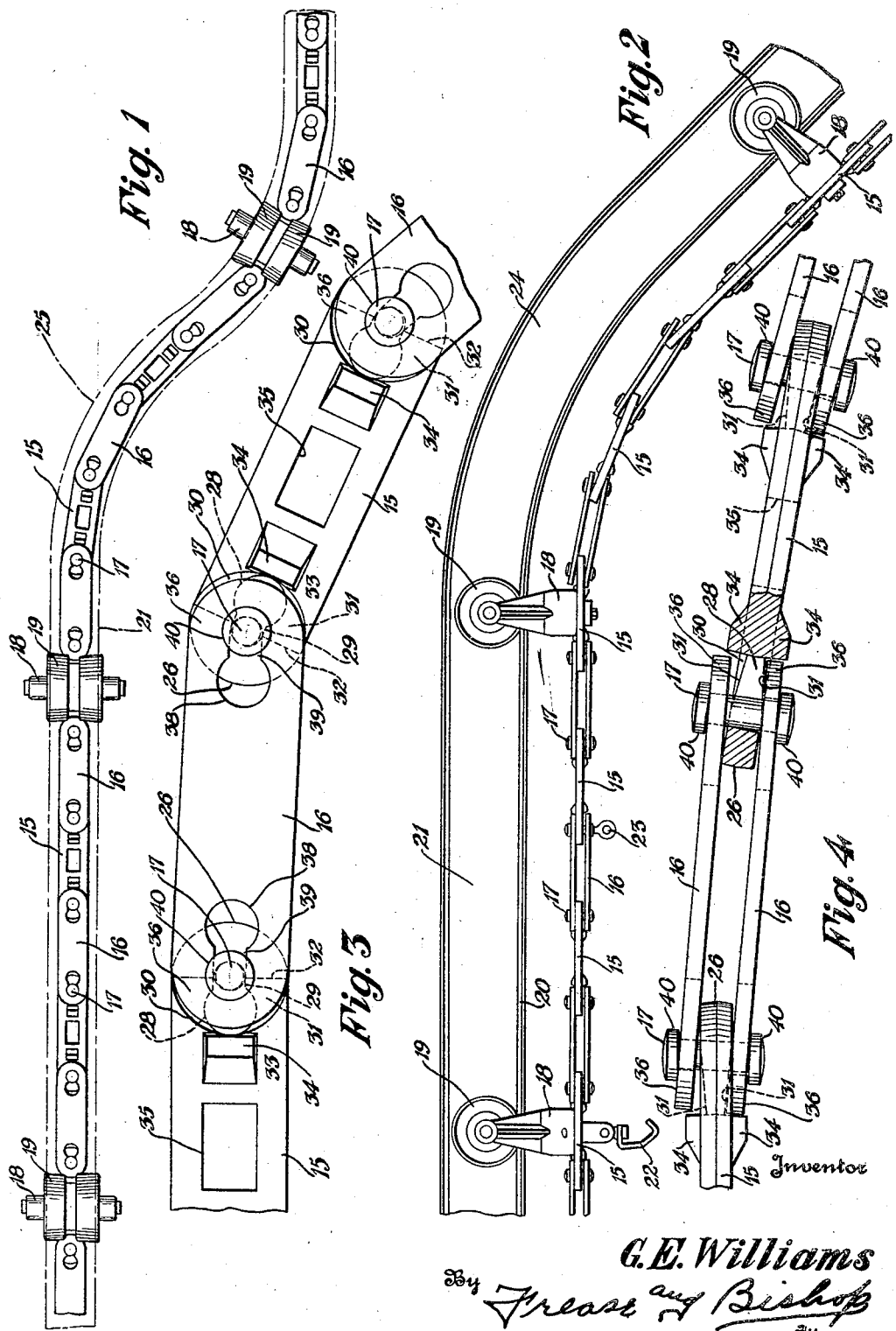

Aug. 9, 1932.    G. E. WILLIAMS    1,871,140
CONVEYER CHAIN
Filed May 28, 1930    2 Sheets-Sheet 2
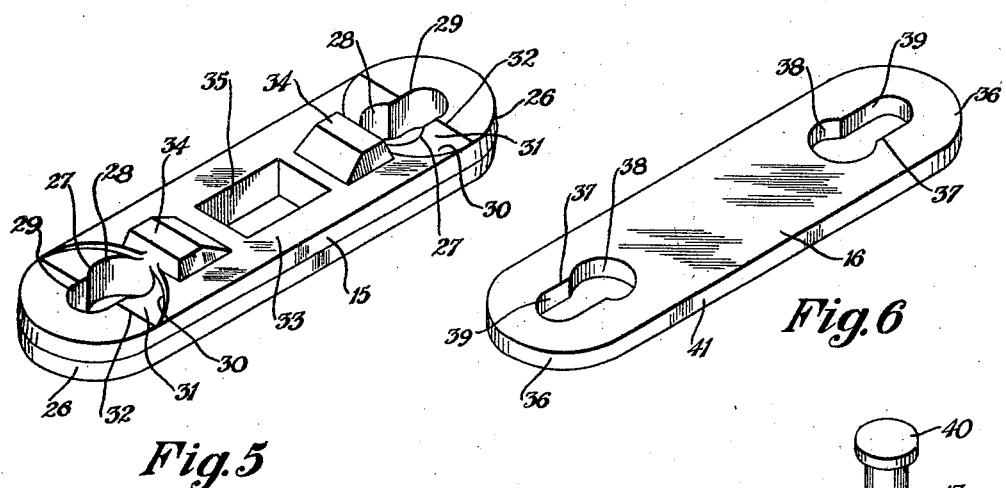
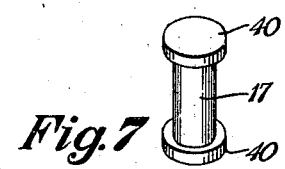
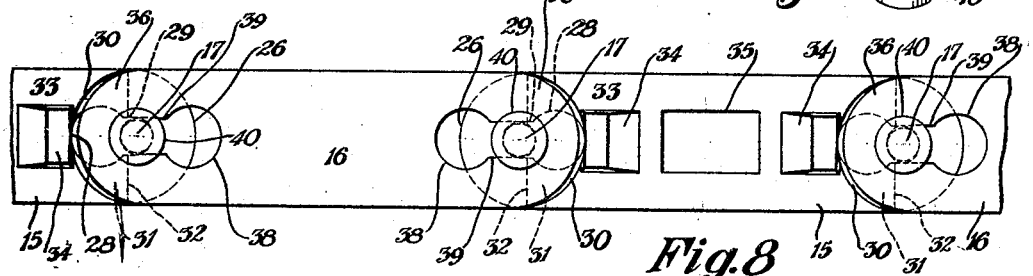
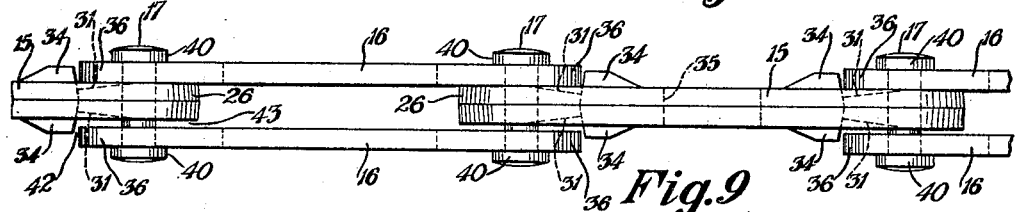
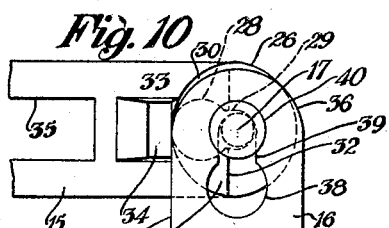
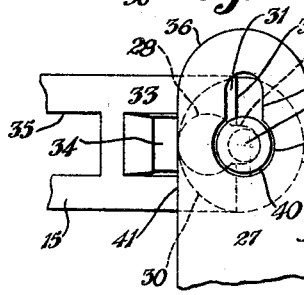
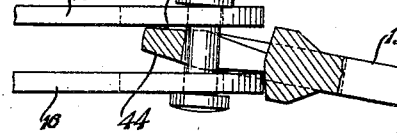
Inventor
G. E. Williams
By Frease and Bishop
Attorneys Patented Aug. 9, 1932

1,871,140

UNITED STATES PATENT OFFICE

GEORGE E. WILLIAMS, OF ALLIANCE, OHIO, ASSIGNOR TO TRANSUE AND WILLIAMS STEEL FORGING CORPORATION, OF ALLIANCE, OHIO, A CORPORATION OF DELAWARE

CONVEYER CHAIN

Application filed May 28, 1930. Serial No. 456,422.

The invention relates to conveyer chains of the universal detachable link type which are commonly used in large manufacturing plants for conveying articles being manufactured along a routed production line.

Prior types of conveyer chains of this general character have included links detachably connected together by a headed pin locked against rotation in assembled relation with the constituent links. Such conveyor chains have been capable of universal movement, that is, movement around a curve in either a horizontal plane or in a vertical plane or in a combination of the same.

However, such prior constructions of conveyer chains have always had a certain amount of backlash when in assembled or operating position which in many cases has been sufficient to permit the pivot pins to become unlocked, due to relative longitudinal movement between adjacent conveyer chain links.

Moreover, the pivot pins of prior constructions have always been assembled in fixed non-rotatable relation with one of the conveyer chain link members, so that it has rotatable connection with the other conveyor chain link member, causing the pivot pin to be worn away at one place, and to be free from wear at another place.

Moreover, prior constructions of conveyer chains of this character have always required heavy beam tracks and a large size drive mechanism because of their heavy construction.

One of the objects of the present invention is to provide a conveyer chain in which the constituent links may be readily and quickly detached one from another for performing necessary repairs and replacements.

A further object of the present invention is to provide a conveyer chain construction of this character, which is capable of universal movement, that is, movement around curves either in a horizontal plane or in a vertical plane, or in a combination of the same.

A further object of the present invention is to provide a conveyer chain construction of this character which is free from backlash when the chain is in assembled and operating position, so that the connection between the constituent links can never become accidentally unlocked.

A further object of the present invention is to provide a conveyer chain construction in which the pivot pin connection between adjacent links permits free rotation of the pivot pin with respect to all of the links connected thereby, so that the pivot pin will rotate freely at all times so as to equally distribute wear on its entire periphery.

It is a further object of the present invention to provide means for locking adjacent links against relative longitudinal movement when the conveyer chain is assembled in operative relation.

It is a further object of the present invention to provide a conveyer chain construction in which the constituent elements are small and light in weight, so as to require only a small beam track and a small drive mechanism.

And finally, it is an object of the present invention to provide a conveyer chain construction having only three constituent elements which do not require any special tools for assembling the same in operative relation.

These and other objects may be attained by providing a construction, a preferred embodiment of which is shown in the accompanying drawings, which may be stated in general terms as including outer links provided with keyhole slots at their end portions, inner links provided with keyhole slots at their end portions, headed pins freely rotatably assembled in the outer and inner link keyhole slots, permitting movement of the chain conveyer around a curve in one plane, recesses in the surfaces of some of the link members adjacent the keyhole slots, permitting movement of the chain around a curve in another plane, and stop means on certain of the links preventing relative longitudinal movement between the link members when the links are in assembled operative relation.

The details of construction of the preferred embodiment of the invention are fully explained below by reference to the accompanying drawings, in which:

Figure 1 is a fragmentary plan view of the improved conveyor chain construction showing the same moving around curves located in a horizontal plane, the I-beam track for the conveyor chain being shown diagrammatically in dot-dash lines;

Fig. 2 is a fragmentary side elevation of the improved conveyor chain construction showing the same moving in a curve located in a vertical plane;

Fig. 3 is an enlarged, fragmentary plan view of several chain links showing the position which the links assume in rounding a curve located in a horizontal plane, such as shown in Fig. 1;

Fig. 4 is an enlarged, fragmentary side elevation of several chain links showing the position which the links assume in rounding a curve located in a vertical plane, such as shown in Fig. 2.

Fig. 5 is a perspective view of one of the improved conveyor chain inner links;

Fig. 6 is a perspective view of one of the improved conveyor chain outer links;

Fig. 7 is a perspective view of the improved conveyor chain headed link connecting pin;

Fig. 8 is a plan view of a number of links and pins in assembled operative relation;

Fig. 9 is a side elevation of the conveyor chain construction shown in Fig. 8;

Fig. 10 is a plan view showing the first position to which an outer link is moved for detaching the same from connection with an inner link;

Fig. 11 is a plan view showing the final position of an outer link with respect to an inner link just before removal of the connecting pin for detaching the connection between adjacent links; and Fig. 12 is a fragmentary view of the improved conveyor chain construction showing a modified form of inner link.

Similar numerals refer to similar parts throughout the various figures of the drawings.

The improved conveyor chain construction is shown in a typical installation in Figs. 1 and 2, and includes inner links indicated generally at 15, outer links indicated generally at 16, and connecting pivot pins indicated generally at 17.

Trolley brackets 18 may be connected in any suitable manner at intervals to certain inner links 15, and trolley wheels 19 are journaled on the brackets 18 for riding on the lower flange 20 of the I-beam track 21 for suspending the chain conveyor from the track.

Suitable hooks 22, or eyes 23, or other similar means may be attached to the conveyor chain for suspending articles to be carried along the routed production line, which the I-beam track 21 follows.

The I-beam track may be curved at 24 in a vertical plane, as shown in Fig. 2, for directing the conveyor chain from one floor of a plant to another floor, or the track may be curved in a horizontal plane at 25, as shown in Fig. 1, for directing the conveyor chain to desired places in a routed production line.

When the path of the chain conveyor is curved as shown in Fig. 1, suitable means is provided at the turn for causing the conveyor chain to follow a path directly underneath the location of the I-beam track indicated diagrammatically in dot-dash lines in Fig. 1.

Each inner link 15, best shown in Fig. 5, is preferably a drop forging and is provided with rounded end portions 26, and the rounded end portions 26 are provided centrally with keyhole slots 27 having rounded head opening portions 28 and elongated bearing portions 29.

Each inner link 15 is also provided with cut-out portions or recesses 30 at its end portions, each recess 30 partially surrounding a keyhole slot 27, and the recesses are formed by providing faces 31 extending from the lines 32 in angled relationship with the side faces 33 of the link, for a purpose which will be hereinafter described.

A stop lug 34 extends outward from each side face 33 of each link 15 adjacent each keyhole slot 27 and recess 30 for a purpose which will be hereinafter described. These stop lugs are preferably aligned with the keyhole slots and extend outwardly beyond the outer surfaces of the links 15.

A through opening 35 is provided in the inner link 15 intermediate its end portions for providing means for connecting trolley brackets 18 thereto.

Each outer link 16, best shown in Fig. 6, is preferably a stamping and is provided with rounded end portions 36, and the rounded end portions 36 are provided centrally with keyhole slots indicated generally at 37, including rounded head opening portions 38 and elongated bearing portions 39.

Each connecting pivot pin 17 is preferably provided with integral heads 40 at each end.

In assembling the inner links 15, the outer links 16, and pivot pins 17 to form a conveyor chain, a pivot pin 17 is inserted through each head opening 28 of an inner link keyhole slot 27, and is then moved along the keyhole slot to be engaged in the elongated bearing portion 29 thereof.

To outer links 16 held at right angles with respect to the inner link 15, as shown in Fig. 11, have their keyhole slots 37 engaged with a pivot pin 17 by inserting the heads 40 of the pivot pin through the head opening portions 38 of the keyhole slots, after which the elongated bearing portions 39 are moved into engagement with the pivot pin 17 by moving the outer links 16 to the position shown in Fig. 10; meanwhile the stop lugs 34 engage the side edges 41 of the outer links 16, as shown in Fig. 11, to prevent the pivot pin 17 from moving out of engagement with the bearing portion 29 of the keyhole slots 27.

After the outer and inner links have reached the position shown in Fig. 10, the outer links 16 may be rotated about the pivot pin 17 to the assembled operative position shown in Fig. 8, the rounded end portions 36 of the outer links just clearing the stop lugs 34 to permit this rotation of the outer links 16.

When the links and pins are in assembled relation to form a conveyor chain such as shown in Figs. 8 and 9, relative longitudinal movement of the outer links 16 and inner links 15 is prevented, because the stop lugs 34 extend outwardly sufficiently to abut the rounded end portions 36 of the outer links 16 whether the chain is in a linear or curved position, except for a slight amount of clearance, shown at 42 in Fig. 9; and the pivot pins 17 are freely rotatably located in the elongated bearing portions 29 and 39 of the inner and outer links 15 and 16 respectively, the heads 40 of the pivot pins preventing relative lateral movement between the outer and inner links except for a slight amount of clearance also shown in Fig. 9 at 43.

It is pointed out that the elongated bearing portions 39 of the keyhole slots 37 in the outer links 16 are longer than the elongated bearing portions 29 of the keyhole slots 27 in the inner links, so that the slight relative longitudinal movement of the links 15 and 16 due to the clearance 42, will not permit accidental unlocking of the pivotal connection between the outer and inner links.

Accordingly, the conveyor chain when operating may turn a curve in a horizontal plane, as shown in Fig. 1, so that the various links in turning the curve assume positions such as shown in Fig. 3, wherein each of the inner and outer links pivot about the pivot pins 17; and the conveyor chain may also turn a curve located in a vertical plane, as shown in Fig. 2, at which time the links assume the positions shown in Fig. 4, in which certain end portions 36 of the outer links are received in the recesses 30 formed in the end portions of the inner links 15 adjacent the stop lugs 34 and keyhole slots 27.

Thus, the constituent links of the improved conveyor chain construction are of simple and light construction and may be readily and quickly attached or detached in a manner above described, without the use of any special tools, and the conveyor chain is capable of universal movement free from backlash.

Moreover, the connection between the constituent links can never be accidentally unlocked and the pivot pins connecting the links are always permitted to freely rotate in the bearing portions of the keyhole slots, so as to equally distribute wear on the entire periphery of the pivot pins.

And finally, the stop lugs carried preferably by the inner links, prevent relative longitudinal movement of the links when the chain is in a linear or a curved position.

In the modified form of construction shown in Fig. 12, the inner link 15 is provided with cut-off bevelled end portions 44 which function in a manner similar to the recesses 30 and permit the chain conveyor to round a curve located in a vertical plane which is sharper than the curve shown in Fig. 4, the construction of the links 15 and 16 and the pin 17 being otherwise the same as above described.

If it may be desired to round even a sharper curve than is shown in Fig. 12, the inner surfaces of the outer links 16 may be provided with bevelled ends and recesses similar to the bevelled ends 44 and recesses 30 provided in the inner link 15.

I claim:

1. Conveyer chain construction including outer link members provided with bearing openings in their end portions, inner link members provided with bearing openings in their end portions, headed pins freely and detachably rotatably mounted in said bearing openings for connecting adjacent links together, cut-out portions provided in the surfaces of some of the link members partially surrounding the bearing openings and adapted to receive the ends of adjacent link members when the chain is in a curved position, and stop means on certain of the link members between and aligned with their bearing openings preventing relative longitudinal movement between the link members when the chain is in a linear or a curved position.

2. Conveyer chain construction including outer link members provided with keyhole slots in their central end portions, inner link members provided with keyhole slots in their central end portions, headed pins freely and detachably mounted in said keyhole slots for connecting adjacent links together, cut-out portions provided in the surfaces of some of the link members partially surrounding the keyhole slots and adapted to receive the ends of adjacent link members when the chain is in a curved position, and stop means on certain of said link members and aligned with said keyhole slots for preventing relative longitudinal movement between the link members when the chain is in a linear or a curved position.

3. Conveyer chain construction including outer link members provided with bearing openings in their central portions, inner link members provided with bearing openings in their end portions, headed pins freely and detachably rotatably mounted in said bearing openings for connecting adjacent links together, recesses provided in the outer surfaces of the inner links partially surrounding the bearing openings and adapted to receive the ends of adjacent link members when the chain is in a curved position, and a stop lug located between and aligned with said inner link bearing openings and projecting outwardly from each side of each end portion of each inner link adjacent said recesses and said bearing openings a sufficient distance for preventing relative longitudinal movement between the link members when the chain is in a linear or a curved position.

4. In a conveyer chain, a link member provided with a keyhole slot having a bearing portion at each central end portion of the link, there being recesses provided in the side surfaces of the link at each end portion partially surrounding each keyhole slot, and stop lugs aligned with the keyhole slots and projecting outwardly from each side surface of the link adjacent each keyhole slot and recess.

In testimony that I claim the above, I have hereunto subscribed my name.

GEORGE E. WILLIAMS.